United States Patent [19]

Hatanaka

[11] 4,422,930
[45] Dec. 27, 1983

[54] APPARATUS FOR TREATING WASTE WATER

[75] Inventor: Misao Hatanaka, Toda, Japan

[73] Assignees: Kajima Kensetsu Kabushiki Kaisha; Nippon Sangyo Kikai Kabushiki Kaisha, both of Tokyo, Japan

[21] Appl. No.: 343,894

[22] Filed: Jan. 29, 1982

[30] Foreign Application Priority Data

Nov. 19, 1981 [JP] Japan .......................... 56-172254[U]

[51] Int. Cl.³ ............................................. C02F 3/04
[52] U.S. Cl. .................................... 210/150; 210/615
[58] Field of Search ............... 210/150, 151, 615, 503, 210/508

[56] References Cited

U.S. PATENT DOCUMENTS

| | | | |
|---|---|---|---|
| 3,238,124 | 3/1966 | Burton | 210/150 |
| 4,088,571 | 5/1978 | Helgesson | 210/615 |
| 4,167,482 | 9/1979 | Müller | 210/503 |
| 4,169,050 | 9/1979 | Serfling et al. | 210/510 |

FOREIGN PATENT DOCUMENTS 1560539 2/1969 France ................................ 210/615
53-35261 4/1978 Japan ................................. 210/151

Primary Examiner—Benoit Castel
Attorney, Agent, or Firm—James E. Nilles

[57] ABSTRACT

An apparatus for treating waste water in which a large number of soft ribbon-like contact members having loop-like fluffs for retaining the active sludge are vertically spread between a large number of suspension rods arranged vertically inside the catalytic oxidation tank in order to permit the ribbon-like contact members to retain the active sludge, to promote the biological oxidation reaction and to permit the catalytic oxidation liquid to flow through the gaps between the implanted ribbon-like contact members that are capable of swaying, thereby preventing clogging of the passages due to the active sludge. Both ends of each of said large number of suspension rods are interconnected by bendable ribbon-like gap-retaining members.

3 Claims, 9 Drawing Figures

4,422,930

APPARATUS FOR TREATING WASTE WATER

BACKGROUND OF THE INVENTION

1. Field of the Invention

This invention relates to an apparatus for treating organic waste water by catalytic oxidation and more specifically to a support structure for a large number of soft ribbon-like contact members that are spread in the vertical direction in order to retain active sludge.

2. Description of the Prior Art

Dipping filter beds employed conventionally for catalytic oxidation of organic waste water make use of an aggregate of a large number of thin pipes or a honeycomb structure but since their size becomes great as a whole, they are difficult to transport or to assemble. Moreover, thin water passages are likely to get clogged because the passages are fixed and once clogging occurs, the operation of the apparatus must be stopped in order to clean the filter bed. The cleaning work itself is not so easy, either. To solve these problems, a dipping filter bed has been developed in which a large number of ribbon-like contact members, consisting of a synthetic fiber and having a large number of fluffs projecting therefrom, extend in the vertical direction.

According to this filter bed, a large number of suspension rods are juxtaposed with one another in the vertical direction of the catalytic oxidation tank and a large number of ribbon-like contact members are spread vertically between the suspension rods. Since the gaps between the implanted ribbon-like contact members serve as the passages for the waste water and since the ribbon-like contact members sway in the water, the filter bed has less tendency toward clogging due to the sludge as compared with the fixed filter bed. However, it is an extremely complicated and troublesome work to fix a large number of ribbon-like contact members at the upper and lower positions inside the tank. If a large number of ribbon-like contact members are fixed in advance to the suspension rods in a factory for shipment and a large number of suspension rods are then arranged vertically at the site of treatment, the long ribbon-like contact members are easily entangled with one another and impede smooth assembly.

SUMMARY OF THE INVENTION

It is a first object of the present invention that a large number of soft ribbon-like contact members having loop-like fluffs for retaining the active sludge are vertically spread between a large number of suspension rods arranged vertically inside the catalytic oxidation tank in order to permit the ribbon-like contact members to retain the active sludge, to promote the biological oxidation reaction and to permit the catalytic oxidation liquid to flow through the gaps between the implanted ribbon-like contact members that are capable of swaying, thereby preventing clogging of the passages due to the active sludge.

It is a second object of the present invention that the ribbon-like contact members are spread vertically between the suspension rods juxtaposed with one another at the upper and lower positions inside the catalytic oxidation tank in such a fashion that the long ribbon-like contact members describe a corrugated form in the vertical direction. According to this arrangement, the ribbon-like contact members can be fitted continuously and easily thereby to facilitate the assembly and can also be spread slantingly with respect to the vertical direction thereby to improve the contact property with the water for treatment.

It is a third object of the present invention that a large number of suspension rods, to which the ribbon-like contact members are fitted, are unitarily interconnected at their ends by supple belt-like gap-retaining members so as to render the gaps between the suspension rods contractable. According to this arrangement, the dipping filter bed is a cubic structure having a large number of ribbon-like contact members spread in the vertical direction and is contractable in the vertical direction as well as to the right and left, thus facilitating the transportation, storage and assembly of the filter bed.

It is a fourth object of the present invention that clamping pipes having openings that extend in the axial direction are fitted to the suspension rods on which a large number of ribbon-like contact members are spread so that the ribbon-like contact members can be easily fixed to the suspension rods.

These and other objects and features of the present invention will become more apparent from the following description to be taken in conjunction with the accompanying drawings.

DESCRIPTION OF THE PREFERRED EMBODIMENTS

Figure 1:
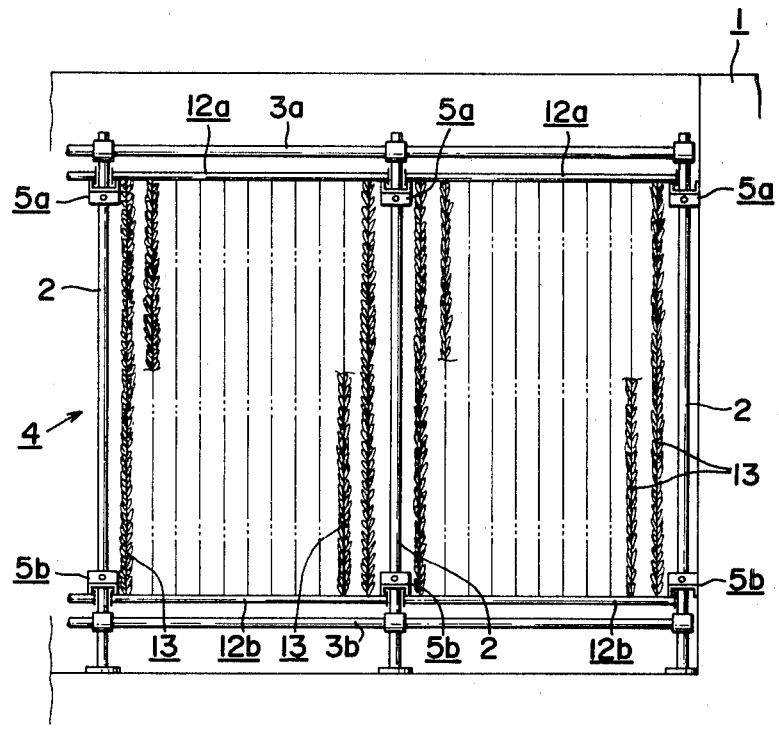
FIG. 1 is a longitudinal sectional front view of an apparatus for treating waste water in accordance with an embodiment of the present invention.
Figure 2:
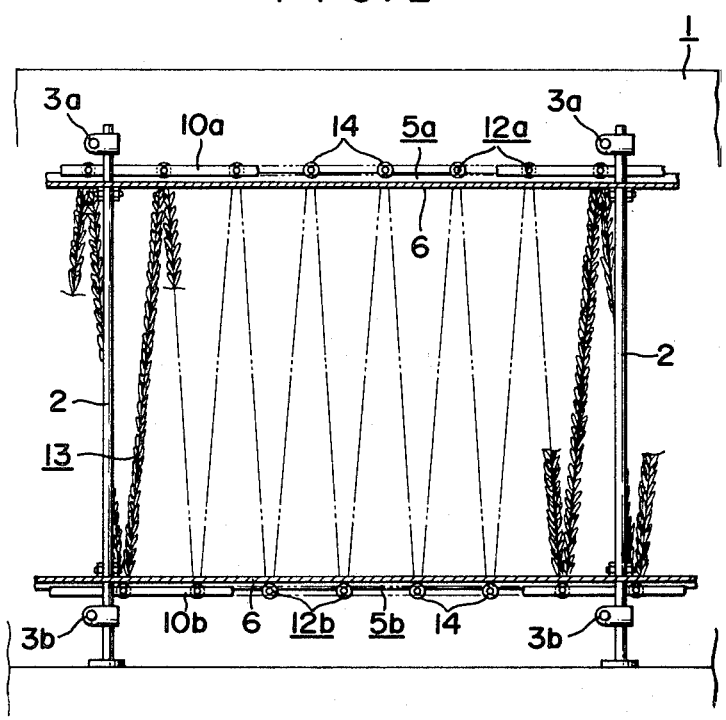
FIG. 2 is a side view of FIG. 1.
Figure 3:
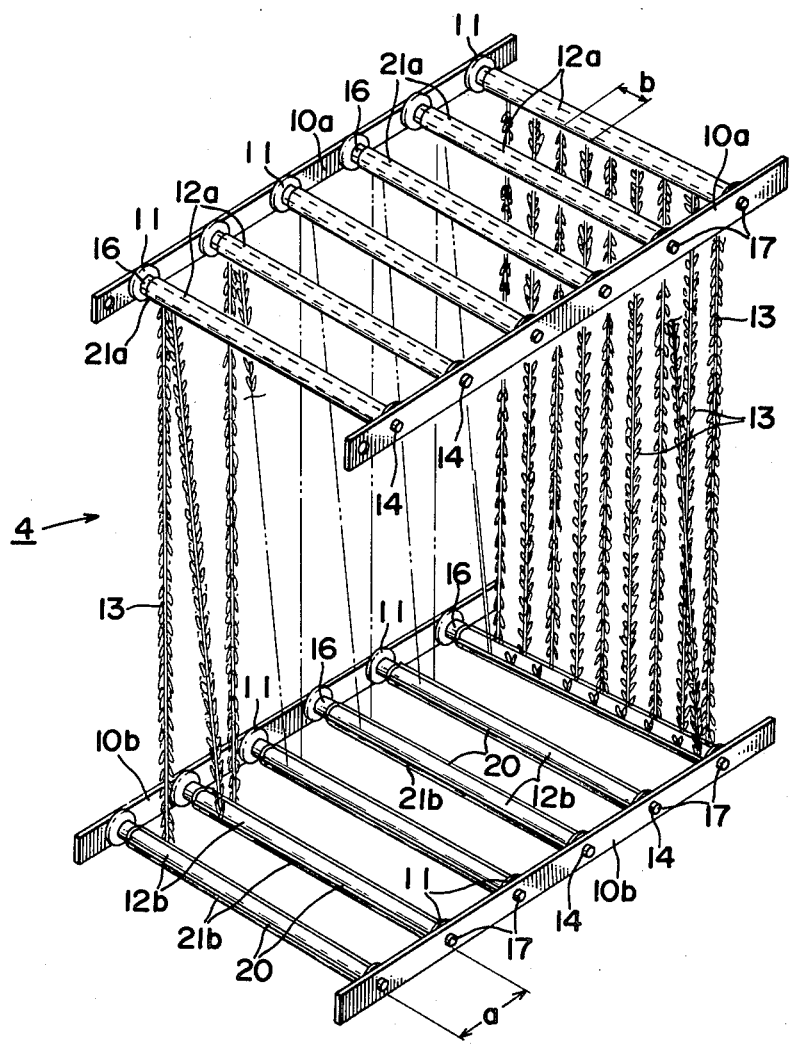
FIG. 3 is a perspective view of the filter bed main body of the apparatus of FIG. 1.
Figure 4:
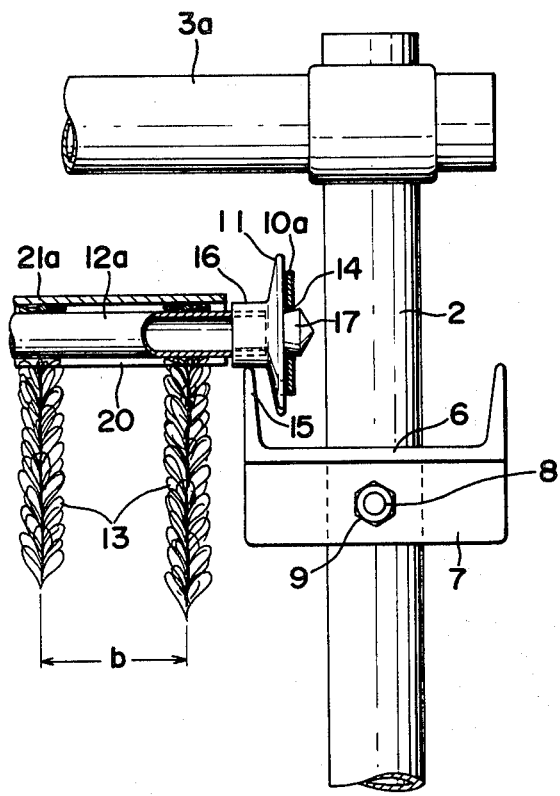
FIG. 4 is an enlarged longitudinal sectional front view of suspension rod fitting portions of the apparatus.
Figure 5:
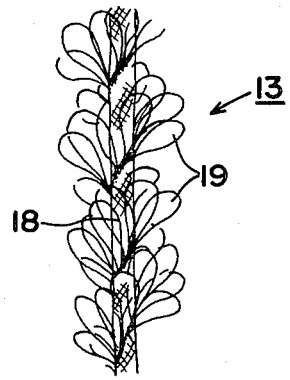
FIG. 5 is a partial enlarged view of ribbon-like contact members of the apparatus.
Figure 6:
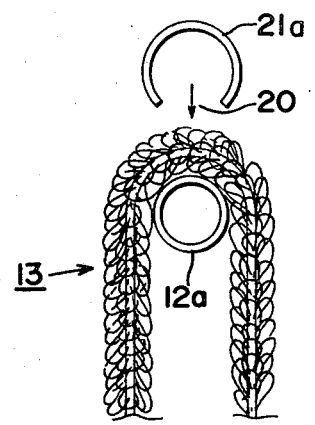
FIG. 6 is an enlarged view showing a suspension rod, in cross-section, in relation to a ribbon-like contact member trained over it and a clamping pipe that confines the contact member against sliding relative to the suspension rod.

An embodiment of the present invention will now be described with reference to FIGS. 1 through 6.

Reference numeral 1 represents a catalytic oxidation tank for treating organic waste water such as city sewage, industrial waste liquor and the like by catalytic oxidation. Pipe support poles 2 are implanted inside the tank 1 at its front and rear and to the right and left, with suitable gaps between them, and upper and lower pipe girders 3a, 3b are interconnected to these support poles 2, thereby defining a three-dimensional frame into which a filter bed main body 4 is to be fitted. Secured to opposite sides of the frame are a pair of horizontally extending upper rail members 5a and a pair of horizontally extending lower rail members 5b, the rail members of each pair being laterally opposite one another. Each rail member has a U-shaped cross-section, and the upper rail members 5a open upwardly while the lower ones 5b open downwardly. Each rail member 5a, 5b is secured to each support pole 2 by means of a pair of fillet plates 7, 7 formed on the external surface of a bottom plate 6 at each end of the rail member so as to extend in the transverse direction. Each support pole 2 vertically penetrates through the bottom plate 6 between these fillet plates 7, 7 and a bolt 8 is inserted through the support pole 2 and through the fillet plates 7, 7 and is fixed by a nut 9.

The filter bed main body 4 consists of two sets of gap-retaining members 10a, 10a and 10b, 10b that are disposed at upper and lower positions so as to be horizontally opposite one another, suspension rods 12a, 12b that extend horizontally parallel to one another at suitable intervals and are connected between these gap-retaining members 10a, 10a and 10b, 10b with their ends pivoted to the gap-retaining members via anchor members 11, and a large number of soft ribbon-like contact members 13 that extend between the upper and lower suspension rods 12a, 12b.

The gap-retaining members 10a, 10b are ribbon-like members made of a bendable material such as a flexible sheet or synthetic fiber fabric such as rubber or nylon, and through-holes 14 for determining the distance a (a=50 mm–80 mm) between horizontally adjacent suspension rods 12a, 12b are bored in them at suitable intervals.

The suspension rods 12a, 12b are composed of synthetic resin pipes and have a length substantially equal to the distance between horizontally opposite rail members 5a, 5a and 5b, 5b. A large number of suspension rods are juxtaposed with the gaps a between the gap-retaining members 10a, 10a and 10b, 10b opposing one another in the horizontal direction. Disc-like anchor members 11 are fitted to both ends of the rods where they engage with the rail members 5a and 5b. A cylinder shaft 16, formed so as to protrude from the inside of each anchor member 11, slides on the free edge of a flange 15 of each rail member 5a, 5b and is fitted and fixed to the end portion of each suspension rod 12a, 12b. Projecting out from each end of each anchor member 11 is a shaft 17 that is fitted into and fixed to each through-hole 14 of the gap-retaining member 10a, 10b. Each protrusive shaft 17 is shaped in such a fashion that its tip is conical and its diameter progressively increases axially outwardly to some extent from the suspension rod 12a, 12b.

Each soft ribbon-like contact member 13 is formed by permitting the fiber to protrude in a large number of loops from one surface of a narrow fabric consisting of a synthetic fiber of polyamide, polyester, polyvinylidene chloride, polypropylene or the like, then twisting the narrow fabric unidirectionally and applying a tension in the longitudinal direction so that a large number of loop-like fluffs or tufts 19 protrude around the core fabric 18.

The longitudinal ribbon-like contact materials 13 thus formed are then trained alternately in zigzag over upper and lower suspension rods 12a, 12b so as to form the corrugation in the vertical direction between the upper and lower suspension rods 12a and 12b. There are a plurality of ribbon-like contact materials 13 engaged with each suspension rod 12a or 12b at intervals b (b=30 mm–60 mm). Clamping pipes 21a, 21b, each of C-shaped cross-section to have at its top or bottom an opening 20 that extends in the axial direction, and each consisting of a synthetic resin pipe, are fitted to the suspension rods 12a or to the suspension rods 12b in such a manner as to clamp and fix the ribbon-like contact members 13 that are engaged with the suspension rods 12a and 12b.

Next, the operation of the above-described embodiment will be explained.

First, in order to fold the apparatus and to reduce its size for transportation, a large number of upper and lower suspension rods 12a, 12b, that are mounted between upper gap-retaining members 10a, 10a and between lower gap-retaining members 10b, 10b, via the anchor members 11, are brought together by bending the gap-retaining members 10a, 10b, thereby reducing the spaces between the suspension rods 12a and 12b as small as possible. Next, the ribbon-like contact members extending vertically are folded close to the upper and lower suspension rods 12a, 12b, reducing the size as a whole.

The apparatus can be assembled into the catalytic oxidation tank 1 at the site of treatment in the following manner. The ribbon-like contact members 13 that have been folded are extended vertically and the upper and lower anchor members 11 are then engaged with the upper edges 15 and lower edges 15 of the upper and lower rail members 5a, 5b, respectively, utilizing the resiliency of the ribbon-like contact members 13, thereby spreading the ribbon-like contact members 13 in the vertical direction. Next, the cylinder shafts 16 of the anchor members 11 which engage with the upper and lower right and left rail members 5a, 5b, are slid on the flange edges 15 so as to expand the gaps between the suspension rods 12a and 12b and to extend the gap-retaining members 10a, 10b that have been folded. Both ends of the gap-retaining members are then anchored and fixed to the tank 1 or to the support poles 2 while being maintained under lengthwise tension.

The water for treatment is then introduced into the catalytic oxidation tank 1, in which a large number of ribbon-like contact members 13 are spread in the above-mentioned manner, and is permitted to flow while oxygen is being introduced into the tank, whereby the active sludge is deposited on the ribbon-like contact members 13 and the biological oxidation reaction is carried out with the aid of the oxygen that is fed into the tank. Since the ribbon-like contact members 13 spread in the corrugated form in the vertical direction cross the passages of the water for treatment flowing vertically, good contact is established between the water for treatment and the active sludge deposited on the ribbon-like contact members 13. Even if the active sludge becomes locally enriched by any chance, it is swung and peeled off from the contact members 13 by the water stream so that the apparatus is free from clogging.

Figure 8:
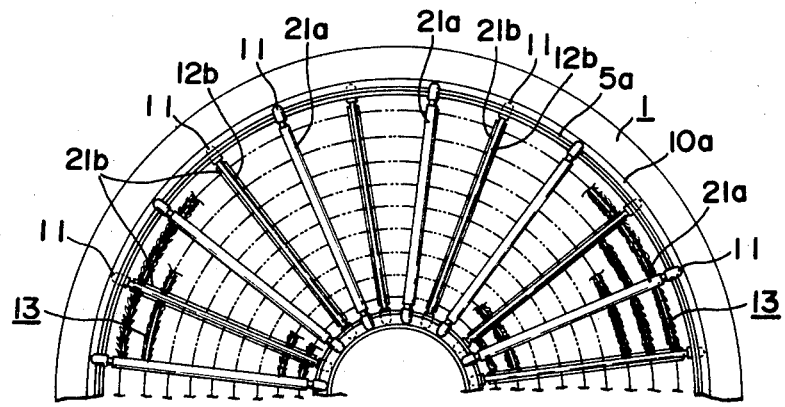
FIG. 8 is a plan view of a part of the apparatus of FIG. 7.
Figure 7:
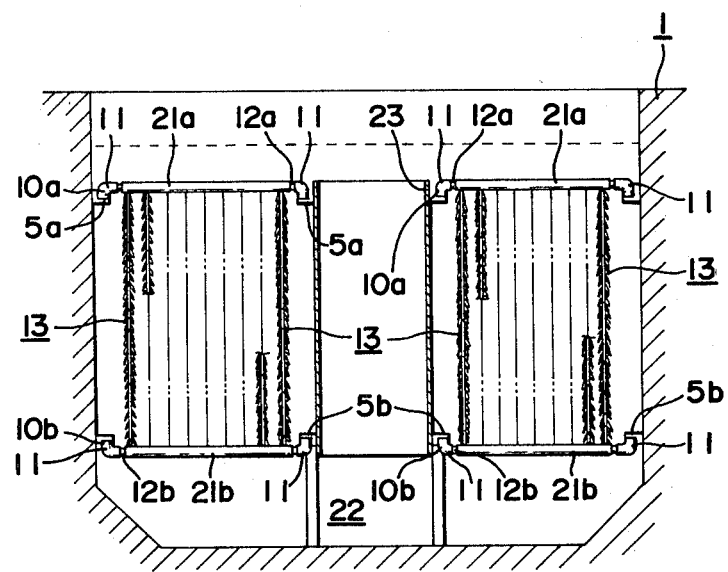
FIG. 7 is a front view of an apparatus for treating waste water in accordance with another embodiment of the present invention.
Figure 9:
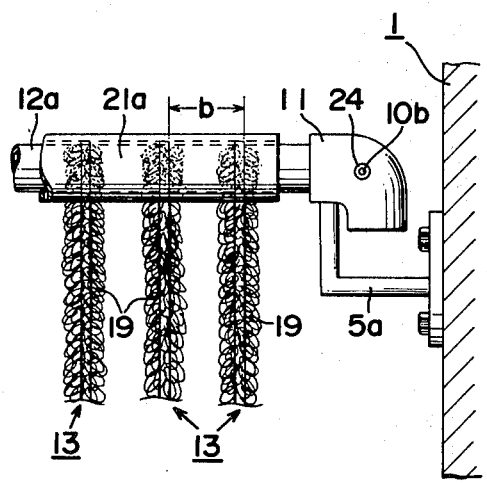
FIG. 9 is an enlarged longitudinal sectional front view of the suspension rod supporting portions of the apparatus of FIG. 8.

FIGS. 7 through 9 illustrate another embodiment of the present invention, in which the catalytic oxidation tank 1 has a cylindrical shape. A draft pipe 23 for forming an air exposure chamber 22 is erected at the center inside the tank 1 in such a manner as to define a passage portion in the vertical direction. Rail members 5a, 5b are disposed vertically and annularly along the inner circumferential wall of the catalytic oxidation tank 1 and the outer circumferential wall of the draft pipe 23. A large number of suspension rods 12a, 12b are radially disposed between the rail members 5a, 5a and 5b, 5b that are adjacent one another in the horizontal direction. Elbow-type anchor members 11 are fitted at both ends of each suspension rod 12a, 12b and are slidably engaged with the rail members 5a, 5b. Ribbon-like gap-retaining members 10a, 10b are inserted through through-holes 24 bored in the anchor members 11 in the radial direction and the anchor members 11 are engaged with the gap-retaining members 10a, 10b in such a manner that they are prevented from moving by knots or swellings that are formed on the gap-retaining members 10a, 10b.

A large number of ribbon-like contact members 13 are suspended from and fixed to the upper and lower suspension rods 12a, 12b in such a fashion as to form a continuous corrugation in the vertical direction and to describe concentric circles spaced at intervals between the outer circumference and the inner circumference. The distances between the concentric circles are preferably smaller towards the outer circumference and become progressively greater towards the inner circumference so that the distribution density of the ribbon-like contact members 13 becomes substantially uniform.

The other construction and action of this embodiment are the same as those of the aforementioned embodiment.

In accordance with the present invention, a large number of soft ribbon-like contact members for retaining the active sludge, having loop-like fluffs, are vertically suspended from a large number of suspension rods juxtaposed vertically inside the catalytic oxidation tank, so that a large number of ribbon-like contact members are implanted inside the catalytic oxidation tank, hold the active sludge thereon and are capable of promoting the biological oxidation reaction for the water for treatment that flows in the vertical direction. Since the ribbon-like contact members are movable, the passage of flow of the water for treatment is not restricted by them. If clogging occurs due to excessive deposition of the active sludge, the ribbon-like contact members are capable of automatically causing it to peel off. Because the ribbon-like contact members are extended between the upper and lower suspension rods in such a manner as to form a continuous corrugation in the vertical direction, the longitudinal ribbon-like members can be easily installed by vertically folding them and fitting the clamping pipes to the respective suspension rods. Since the ribbon-like contact members are spread not vertically but slantingly in the corrugated form, they slant across the passages of flow of the water for treatment and are thus capable of improving the contact effect of the water for treatment. Because both ends of the multiple-stage suspension rods are connected to bendable belt-like gap-retaining members, the size of the apparatus can be reduced as a whole for storage or transportation by bending the bendable belt-like gap-retaining members so as to narrow the distances between the suspension rods and, further, by folding the ribbon-like contact members so as to narrow the distances between the upper and lower suspension rods. The cubic filter bed main body can be easily assembled by extending vertically the bent ribbon-like contact members and then stretching the upper and lower gap-retaining members. It is thus possible to assemble the filter bed main body in a factory, then to reduce its size for transportation and to expand and fit the filter bed at the site of work. As a large number of ribbon-like contact members are fitted in advance between the upper and lower suspension rods, they never get entangled with one another during work at the site, thus permitting the smooth operation.

To clean or repair instruments disposed below the filter bed main body such as air spray pipes or the like, maintenance of these instruments can be carried out without removing the filter bed main body from the tank, by bending the upper and lower gap-retaining members and pulling a large number of ribbon-like contact members to one side like a curtain.

What is claimed is:
1. Apparatus for promoting biological oxidation of sludge in a waste water treatment tank, comprising:
   A. means defining a substantially rigid frame having
      (1) a pair of horizontally extending upper rails that are laterally spaced apart and opposite one another and
      (2) a pair of laterally opposite horizontally extending lower rails, each spaced below one of said upper rails;
   B. a first plurality of rods, each bridging across said pair of upper rails and resting upon the upper rails to be shiftable along them;
   C. a second plurality of rods, each bridgingly engageable with said lower rails at the undersides of the latter to be shiftable along said lower rails;
   D. a plurality of ribbon-like contact members,
      (1) each having numerous laterally projecting strands along its length,
      (2) each trained in zigzag, with substantially vertically extending stretches, alternately over successive rods of said first plurality and under successive rods of said second plurality, to be supported by the rods of said first plurality and to support the rods of said second plurality in engagement with said lower rails, and
      (3) the several contact members being engaged with each rod in spaced relation to one another along the length of the rod; and
   E. a pair of supple, belt-like gap-retaining members for each of said pluralities of rods, each of said gap-retaining members having a connection with one end of each of the rods of its plurality, said connections being spaced apart at predetermined distances along the gap-retaining member so that each pair of gap-retaining members, when maintained under lengthwise tension, establishes the distances between adjacent rods of its plurality.
2. The apparatus of claim 1, further characterized by:
   F. means on each end portion of each of said rods defining opposite axially inwardly facing abutments which cooperate with the rails engaged by the rod to substantially confine the rod against axial displacement relative to the rails.
3. The apparatus of claim 1, further characterized by:
   F. an elongated clamping member of substantially C-shaped cross-section embracing each of said rods and clampingly cooperating with the rod to confine contact members engaged with it against sliding displacement relative to it.

* * * * *